L. F. BIESMEYER AND O. STOCKSICK.
RESILIENT TIRE CASING FILLER.
APPLICATION FILED APR. 5, 1921.
1,388,843.
Patented Aug. 30, 1921.
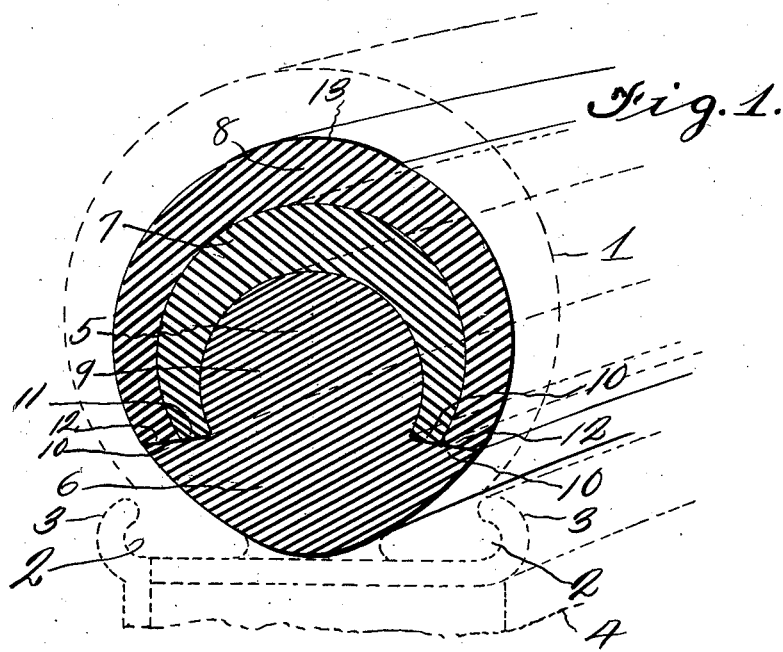
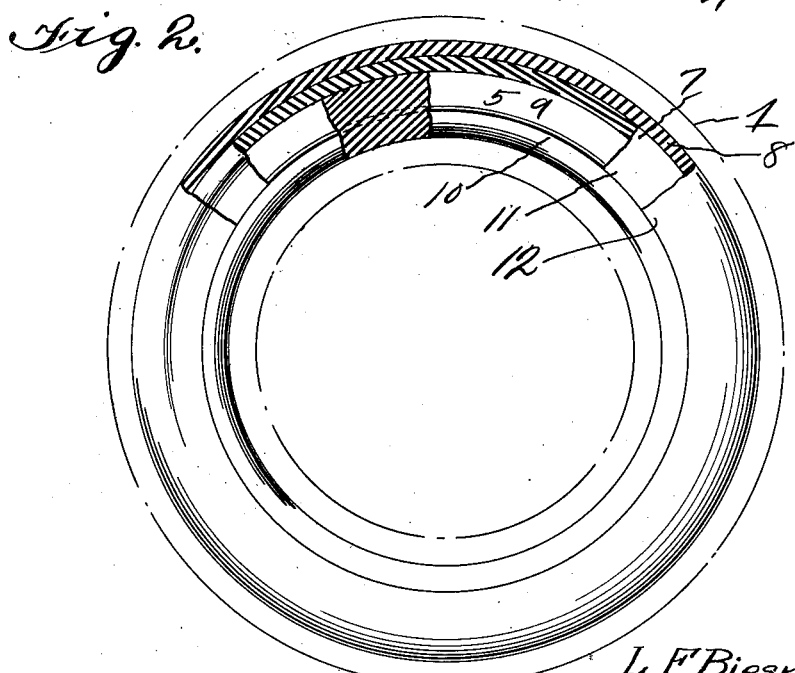
Inventors
L. F. Biesmeyer
Otto Stocksick

UNITED STATES PATENT OFFICE.

LORENZ F. BIESMEYER AND OTTO STOCKSICK, OF CHAMOIS, MISSOURI.

RESILIENT-TIRE-CASING FILLER.

1,388,843.  Specification of Letters Patent.  Patented Aug. 30, 1921.

Application filed April 5, 1921. Serial No. 458,649.

*To all whom it may concern:*

Be it known that we, LORENZ F. BIESMEYER and OTTO STOCKSICK, citizens of the United States, residing at Chamois, in the county of Osage, State of Missouri, have invented a new and useful Resilient-Tire-Casing Filler; and we do hereby declare the following to be a full, clear, and exact description of the invention, such as will enable others skilled in the art to which it appertains to make and use the same.

The invention relates to resilient tires and has for its object to provide a device of this character comprising a casing having a built up core therein which will take the place of the ordinary cushion or pneumatic inner tubes that are inflated with air.

A further object is to provide a core for tire casing, which core is formed from a plurality of annular members, the inner annular member being provided with an annular flange semi-circular in cross sections and adapted to receive the adjacent annular member on which adjacent annular member the outer annular member is disposed, marginal edges of adjacent and outer annular members being in abutting engagement with flanges of the inner annular member.

A further object is to provide a tire core substantially round in cross sections, said tire core being built up from a plurality of interengaged annular members peripherically engaging each other, said annular members being formed from resilient material, such for instance as rubber, and are of increasing degrees of hardness and resiliency from the outer annular member inwardly.

With the above and other objects in view, the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:

Figure 1 is a perspective view of a portion of the tire core, showing a portion of the wheel ring, clencher flanges, and tire casing in dotted line.

Fig. 2 is a side elevation of the tire core, parts being broken away and shown in section to better illustrate the structure.

Referring to the drawings, the numeral 1 designates a conventional form of tire casing of the type used in connection with pneumatic tires. The tire casing 1 has its beads 2 disposed between clencher flanges 3 of a conventional form of demountable rim, which rim is carried by the felly 4 of the wheel. Disposed within the casing 1 is a solid annular core 5, which eliminates the usual inner tube and the inflation thereof, thereby preventing blow outs and punctures. The core 5, which is substantially round in cross sections is built up from a plurality of annular members 6, 7, and 8. The annular member 6 is provided with an annular rib 9 centrally disposed thereon and outwardly extending flanges 10. The member 6 is formed from hard rubber having a limited amount of resiliency. Disposed on the annular rib is the annular member 7 which member is substantially U-shaped in cross section and has the curvature of its inner side eccentric to the curvature of its outer side, thereby forming a member which gradually tapers toward its edges 11, which edges engage the peripheries of the flanges 10. By so shaping the annular member 7, it will be seen it will maintain its proper position transversely on the rib 9 and will not creep circumferentially of said rib. The annular member 7 is of greater resiliency than the annular member 6, the purpose of which will presently appear. Disposed on the annular member 7 is the annular member 8, which member 8 is similarly shaped as the member 7 and has its edges 12 in abutting engagement with the peripheries of the flanges 10, which flanges prevent circumferential creeping of the member 8 on the member 7. However, as the inner and outer annular members 7 and 8 are eccentric in relation to each other, the possibility of transverse movement of the annular members 7 and 8 in relation to each other is reduced to a minimum. The annular member 8 is formed from soft, resilient material, which material is of greater resiliency than the annular member 7 or the annular member 6 and takes up the slight shocks incident to the tire moving over the ground. Greater shocks are taken up by the annular member 7 in connection with the annular member 8. Excessive shocks are absorbed by the combined decreasing resiliency of the annular members. The outwardly extending annular member 8 is provided with an annular tread 13, which outwardly extending annular tread engages the inner periphery of the tire casing 1 and becomes slightly embedded therein, thereby preventing circumferential creeping of the core and preventing excessive heating of the core through friction.

From the above, it will be seen that a tire core is provided which is simple in construction and is positive in its operation, and one wherein the core is built up from a plurality of annular members of gradually diminishing degree of resiliency from the periphery thereof inwardly, thereby providing means for taking up slight shocks by the more resilient material adjacent the periphery of the tire casing and more severe shocks by a body constantly decreasing in resiliency.

The invention having been set forth, what is claimed as new and useful is:

A tire core substantially round in cross section, said core comprising an annular inner member, an annular rib carried by the outer side of the annular inner member and centrally thereof, thereby forming outwardly extending annular flanges, annular sections disposed on the annular rib of the inner member and having their marginal edges in abutting engagement with the faces of the flanges of the annular inner member, said annular sections interengaging each other and having the curvature of the inner and outer sides thereof eccentric to each other.

In testimony whereof we have signed our names to this specification in the presence of two subscribing witnesses.

LORENZ F. BIESMEYER.
OTTO STOCKSICK.

Witnesses:
P. J. PAULSMEYER.
J. B. KUSTER.